United States Patent [19]
Johns

[11] Patent Number: 5,636,883
[45] Date of Patent: Jun. 10, 1997

[54] PICKUP TRUCK PROTECTOR

[75] Inventor: Jesse A. Johns, Dallas, Tex.

[73] Assignee: Second Step Inc., Dallas, Tex.

[21] Appl. No.: 655,686

[22] Filed: Jun. 3, 1996

[51] Int. Cl.$^6$ ........................................................ B60J 11/00
[52] U.S. Cl. ............................ 296/39.2; 296/136; 150/166
[58] Field of Search .................................. 296/39.2, 136;
293/128; 280/770, 850, 847; 150/166

[56] References Cited

U.S. PATENT DOCUMENTS

| 4,041,999 | 8/1977 | Miller | 296/136 X |
|---|---|---|---|
| 4,531,560 | 7/1985 | Balanky | 150/166 |
| 4,561,685 | 12/1985 | Fischer | 293/128 |
| 4,589,459 | 5/1986 | Lantrip | 296/136 X |
| 4,707,016 | 11/1987 | McDonald | 296/39.2 |
| 4,818,006 | 4/1989 | Arndt | 296/32 |
| 4,884,824 | 12/1989 | Radke | 280/770 |
| 4,887,947 | 12/1989 | Bott | 410/144 |
| 4,896,911 | 1/1990 | Duke | 293/128 |
| 4,997,227 | 3/1991 | Falzone et al. | 296/39.2 |
| 5,050,925 | 9/1991 | Brown | 296/136 |
| 5,129,695 | 7/1992 | Norman, II | 293/128 |
| 5,131,709 | 7/1992 | Spica | 296/39.2 |
| 5,209,545 | 5/1993 | Slaugh | 296/136 |
| 5,273,316 | 12/1993 | Infante | 296/136 X |
| 5,290,618 | 3/1994 | Olson et al. | 428/100 |
| 5,360,250 | 11/1994 | Wood et al. | 296/39.2 |
| 5,470,642 | 11/1995 | Egigian | 296/39.1 X |

Primary Examiner—Joseph D. Pape
Attorney, Agent, or Firm—H. Dennis Kelly; Jeffrey T. Hubbard; Timmons & Kelly

[57] ABSTRACT

A pair of covers for the side walls of a pickup truck consist of an outer panel cover and an inner panel cover removably attached along an edge. The outer panel cover overlies the outside face of the side wall and the top rail, and fastens to the bottom edge of the side wall with specially shaped plastic hooks. The inner panel cover removably attaches to wall fasteners that in turn permanently attach to the inside face of the side wall forming part of the cargo bed. The two sides of the inner panel cover are made of materials with different textures, to allow the user a choice of surfaces for lining the bed. A number of tie-down straps provide points for securing a load in the bed. A strip of reinforcing material is attached to the outer panel cover along the section covering the top rail, and provides both stress relief and an attaching surface for the tie-down straps. A flap attached to the outer panel cover is fitted to wrap partly over the front wall of the bed, to prevent wind from blowing between the outer panel cover and the side wall during driving. A decorative panel removably attached to the outer panel cover provides a way to change the appearance of the device and to display a printed message.

9 Claims, 3 Drawing Sheets

PICKUP TRUCK PROTECTOR

BACKGROUND OF THE INVENTION

1. Field of the Invention

This invention relates in general to pickup trucks, and in particular to covers for pickup beds and outer panels, that can be used while driving.

2. Description of the Related Art

Devices for protecting exterior body panels and the cargo bed of pickup trucks are well known. These protectors utilize a number of means for attaching the protective material to the vehicle, which have equally numerous drawbacks. Most permanent fasteners such as screws or bolts require that holes be drilled in the panels, which create potential rust sites and leave an unsightly appearance if the device is ever removed. In addition, many truck owners prefer a device that can be easily removed and reinstalled, rather than one that is permanently installed.

Temporary fasteners also have disadvantages. Snaps and similar fasteners having exposed metal parts can scratch paint on body panels. Magnets, even if not exposed, tend to collect small metal fragments between usages, which can also scratch paint.

U.S. Pat. No. 5,20,545, issued to Slaugh, discloses a device having a covering of a tough flexible material fashioned to fit snugly around the side wall of a pickup truck. The covering is attached to the pickup along the top inside of the cargo bed using snaps, and along the outside bottom edge of the side wall with plastic hook-like fasteners. The Slaugh device provides no protection for the inner side wall surfaces that form sides of the cargo bed. It also does not provide means for securing a load placed in the bed. Finally, the Slaugh device uses snaps, which can scratch the paint on the pickup truck.

A need remained for a pickup truck protector that is easily attached and detached, while still being secured well enough to remain in place during driving at highway speeds or in terrain where the cover will be scraped and poked by brush, trees and the like. A protector providing protection for the cargo bed, and particularly allowing a choice of cover surface textures, was also desired. Such a protector would also preferably provide tie-down points for securing a load in the bed.

SUMMARY OF THE INVENTION

The general object of the invention is to cover and protect the side walls and bed liner of a pickup truck. Another object of the invention is that the portion of the device lining the bed of the pickup be reversible, thus allowing a choice of surfaces for contacting the load being carried in the pickup bed. A third object is to provide points for tying down cargo in the bed. Still another object of the invention is to allow a selection of exterior treatments, including display of a printed message. A final object is that no metallic or otherwise hard parts be employed to prevent scratching the paint on the pickup, and to avoid as much as possible the use of fasteners that require drilling or punching holes in the pickup body panels.

In general, these objects are achieved by the combination of an outer panel cover removably attached to an inner panel cover. The outer panel cover conforms to the outer contour of the side wall. An inner panel cover covers the part of the side wall the forms the side of the cargo bed. The two panel covers attach together along a common edge using hook and loop material. The inner panel cover is made of two pieces of different flexible sheet material, one having a soft surface and the other being tougher and more durable, sandwiched together to form a single piece with reversible sides. This allows the user to choose which type of surface will contact the side wall, and which to leave exposed to cargo in the bed.

The outer panel cover attaches along the bottom of the outer side wall using plastic hooks. The bottom edge of the inner panel cover removably attaches to wall fasteners permanently attached to the inside face of the side wall adjacent to the floor of the cargo bed. When the protector is fastened down, the tension created by the pull of the plastic hooks and wall fasteners holds the protector against the side wall and prevents it from coming off from brush scraping against the device. A small section of fabric is sewn onto the front edge of the outer panel cover, and wraps around the front part of the bed, in the gap between the bed and the passenger cab, to keep air from flowing in between the outer panel cover and the side wall during driving, which would cause the outer panel to flap or loosen.

The portion of the outer panel cover that rests upon the top rail of the side wall is reinforced with a strip of nylon material. A number of tie-down straps are attached to the reinforcing strip and provide points for attaching ropes, straps, cables, bungie cords and the like to secure a load in the cargo bed.

A portion of the exterior of the outer panel cover can be adapted with hook and loop material in order to allow a decor panel to be removably attached. This permits the user to vary the appearance of the protector by applying decor panels having different patterns and designs, or a printed message.

The above, as well as additional objects, features, and advantages of the invention will become apparent in the following detailed description and in the drawings.

DESCRIPTION OF THE PREFERRED EMBODIMENT

Figure 1:
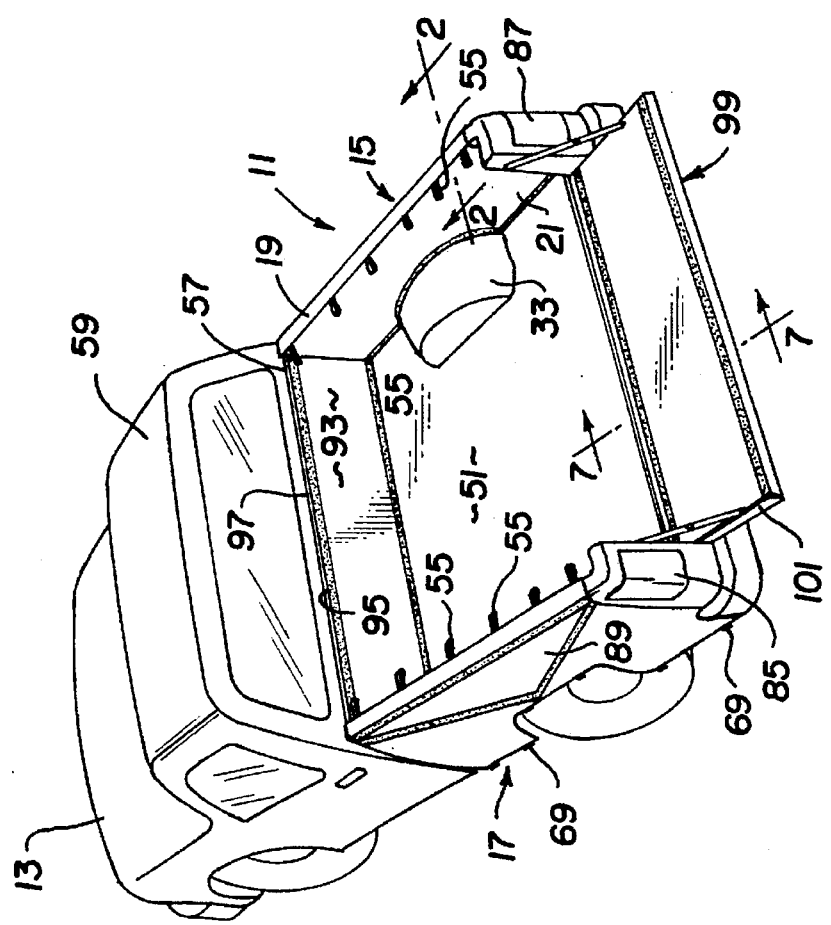
FIG. 1 is a perspective view of a pickup truck protector according to the invention installed on a pickup truck.

FIG. 1 shows the preferred embodiment of the pickup truck protector 11 of the invention as installed on a pickup truck 13. The pickup truck protector 11 includes a pair of covers 15 and 17 that are essentially mirror images of each other. The following general discussion will be confined to the right cover 15, and can be considered to apply to corresponding elements of the left cover 17 as well.

Figure 2:
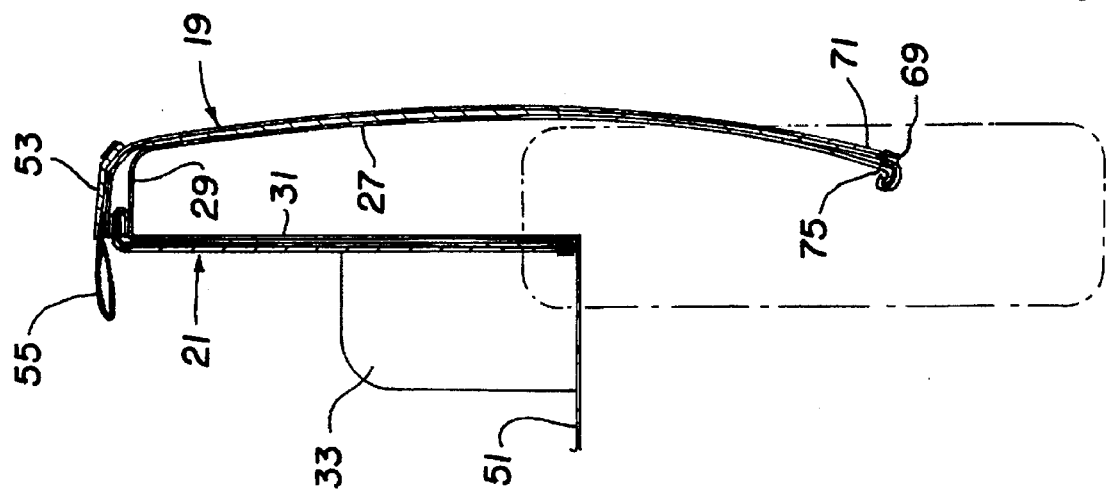
FIG. 2 is a cross-sectional view of one side thereof, taken along line 2—2 in FIG. 1.
Figure 3:
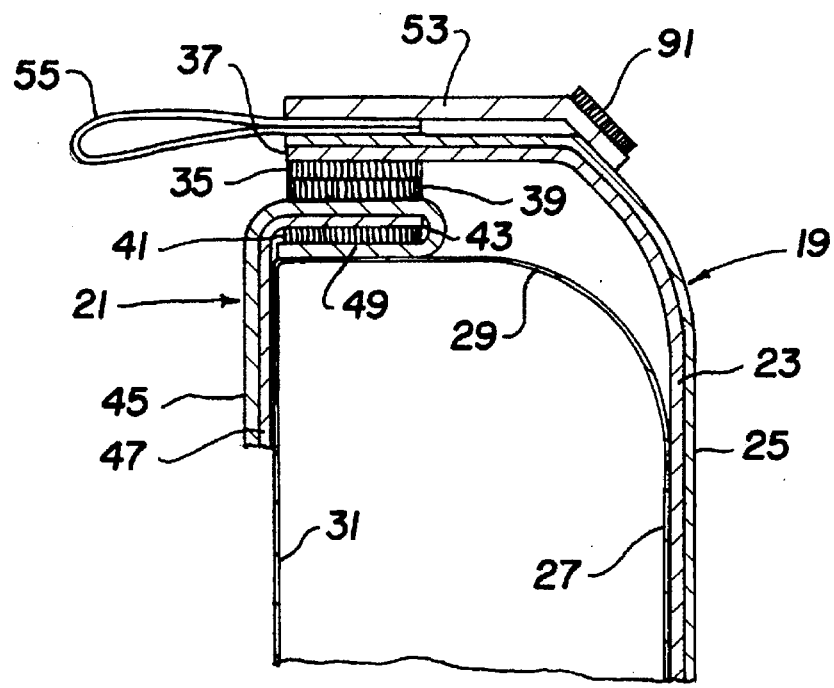
FIG. 3 is an enlarged detail view of the upper portion of FIG. 2.

As shown in FIGS. 1–3, the cover 15 consists of an outer panel cover 19 and an inner panel cover 21. The outer panel cover 19 has an inner lining 23 made of a soft, non-scratching fabric, and an outer cover 25 made of a durable flexible material such as sheet plastic or fabric made of synthetic fiber. The material in the outer cover 25 should be treated with a waterproof coating if it is not inherently waterproof. A single layer of suitable material can also be used. The outer panel cover 19 is formed to fit along an outer side wall 27 and adjacent top rail 29. The inner panel cover 21 is likewise formed to fit along the inner side wall 31, except for the portion displaced by the wheel well 33. A strip 35 consisting of the hooked portion of hook and loop fastening material is sewn or otherwise permanently attached along the upper edge 37 of the outer panel cover 19. The inner panel cover 21 has corresponding strips 39 and 41 made of the looped portion of hook and loop fastening material permanently attached along both sides of its top edge 43, in corresponding relation to the hooked material strip 35 on the outer panel cover 19. The outer panel cover 19 and the inner panel cover 21 thus can be removably connected together using the hook and loop material. Other fastening means can be used, but means employing metal and other hard materials should be avoided to reduce the risk of scratching the paint on the truck with the fastener. Even covered metal parts should be avoided because protective coverings tend to wear away or become cracked, exposing the metallic parts.

The inner panel cover 21 is also made of two sheets of material laminated together to form a first side 45 and a second side 47. The first side 45 is made of a soft material such as felt or artificial fleece. A portion 49 of the soft first side 45 extends beyond the second side 47 and the strips 39 and 41 of loop material. This portion 49 can be tucked between the inner panel cover 21 and the top rail 29 to protect the paint on the top rail 29. The second side 47 is made of tougher, more durable material than the first side 45 and can be the same material as that used to make the outer panel cover 19. Having two different surfaces allows the user to select which surface will contact the inner side wall 31, and which surface to have contact a load (not shown) located in the cargo bed 51. Normally, the softer first side 45 is expected to contact the inner side wall 31 to prevent damaging the truck's paint job, but the sides 45 and 47 can be reversed to provide extra protection to easily-scratched cargo. However, since the shape of the inner panel cover 21 will usually be asymmetrical due to non-centered placement of the wheel well 33, the inner panel cover 21 cannot simply be reversed. To reverse the inner panel cover 21, the right cover 15 and left cover 17 interact. In this case, the inner panel cover 21 for the right cover 15 is laterally exchanged with the inner panel cover 21 for the left cover, and visa versa.

A strip of heavy duty nylon fabric is sewn to the top rail 29 portion of the outer panel cover 19 and forms a spine 53. A number of tie-down straps 55, evenly spaced along the spine 49, are sewn in between the spine 55 and the outer panel cover 19. The straps 55 provide a means for securing ropes, straps, cables, bungie cords and the like to secure loads in the cargo bed 51. It is preferred that each strap 55 be secured to the spine 53 at a single point as shown, rather than securing each strap 55 at two points separated along the length of the spine 53. Having a strap 55 secured at two points tends to result in the cover 15 being twisted about a strap 55 that is being pulled off-center by the load.

Figure 4:
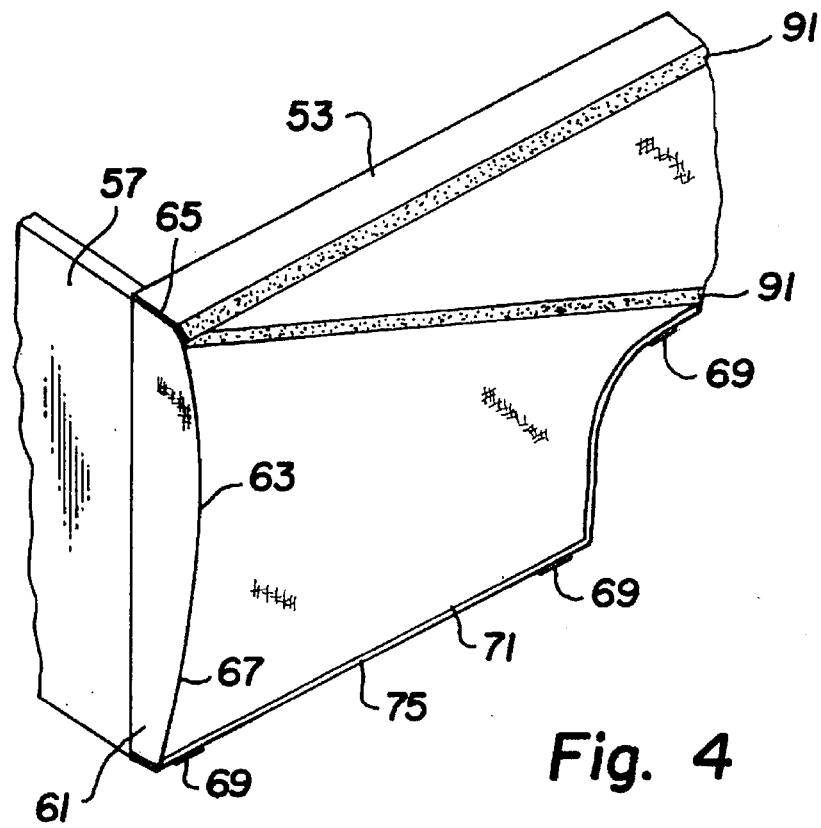
FIG. 4 is a perspective view of one side of the pickup truck protector, showing the protector fitted over the front of the cargo bed of the pickup truck, with the passenger cab removed for clarity.

Turning to FIG. 4, a feature is disclosed for trucks 13 having a front wall 57 physically separated from the passenger cab 59. A flap 61 is sewn along the front edge 63 of the outer panel cover 19, including the top rail portion. The combination of the flap 61 and the outer panel cover 19 wrap snugly around the corner 65 and vertical edge 67 formed by the outer side wall 27, the top rail 29, and the front wall 57. The flap 61 prevents air from blowing in between the outer panel cover 19 and the outer side wall 27 during driving, which could cause the outer panel cover 19 to flap objectionably or even come loose from the truck 13.

Figure 5:
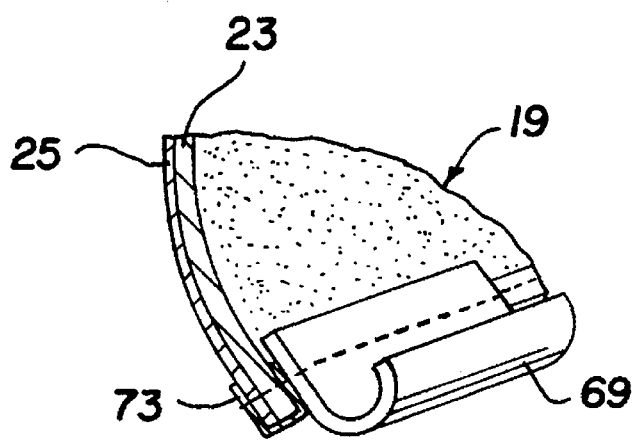
FIG. 5 is a partially cross-sectional perspective detail of the lower edge of an outer panel cover of the pickup truck protector.
Figure 7:
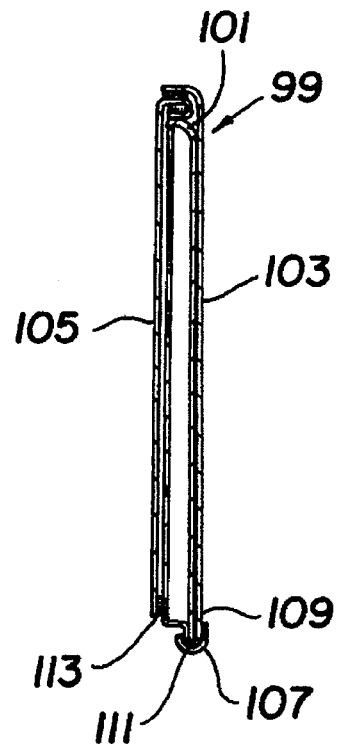
FIG. 7 is a cross-sectional view of the tailgate taken along line 7—7 in FIG 1.
Figure 6:
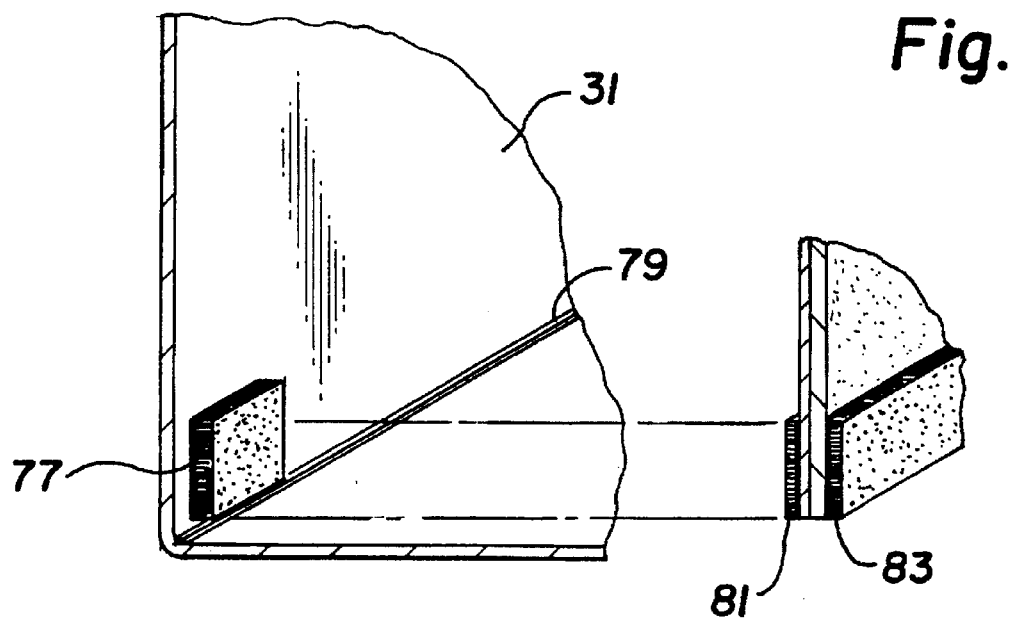
FIG. 6 is an exploded, cutaway perspective view of the inner panel cover and a wall fastener as they are oriented with respect to each other when installed on the cargo bed.

The means for fastening the cover 15 to the truck 13 can be seen in FIGS. 5 and 6. A number of edge fasteners 69 made of a semi-rigid plastic are sewn onto the lower edge 71 of the outer panel cover 19 along with the edge trim 73. These fasteners 69 fit around the lower edge 75 of the outer side wall 27. The shape of the fasteners 69 can be customized for a particular truck 13, and the fasteners 69 sewn in separately from the edge trim 73.

A number of wall fasteners 77 are adhesively attached to the bottom edge 79 of the inner side wall 31, including the portion running around the wheel well 33. Alternatively, a single fastener 77 can be used, shaped to fit around the bottom edge 79. If needed, attaching means such as snap-in rivets can be employed for extra strength, but are not preferred since they require making holes in the inner side wall 31. The fasteners 77 are covered with a heavy duty version of the hooked portion of hook and loop fastening material. Strips 81 and 83 of the corresponding looped portion of hook and loop fastening material are attached to each side of the inner panel cover 21 in corresponding relation to the fasteners 77.

The covers 15 and 17 are installed on the truck 13 by draping the cover over the top rail 29, with the individual elements in roughly their final locations. The edge fasteners 69 are then hooked around the lower edge 71 of the outer side wall 23, while applying a modest upward force on the outer panel cover 19 to hold the edge fasteners 69 in place. The appropriate inner panel cover strip 81 or 83 is then attached to the wall fasteners 77, while ensuring enough tension in the cover 15 or 17 to keep it held snugly against the outer side wall 27, the top rail 29, and the inner side wall 31. The flap 61 may need some adjustment to ensure that it fits snugly as well. As can be seen in FIG. 1, the installed covers 15 and 17 protect the sides of the truck 13 from the point immediately behind the passenger cab 59 to just in front of the tail lights 85 and 87.

As shown in FIGS. 1 and 4, a decorative panel 89 can be attached to the exterior surface of the outer panel cover 19 using hook and look material 91. The decorative panel 89 is shown having a triangular shape, but any suitable shape and size may be used. Decorative panels 89 having different patterns, colors and designs can be provided to allow the user to quickly and easily change the appearance of the outer panel cover 19. Alternatively, the decorative panel 89 can contain a printed message for advertising and related uses.

A front wall liner 93 attaches to the front wall 57 using the same types of wall fasteners as those used with the inner panel cover 21, and depicted in FIG. 6. The front wall liner 93 is made using the same materials and manner of construction as for the inner panel cover 21 with the following exceptions: there is no portion extending beyond the top edge 95 of the front wall liner 93 as in the case of the inner panel cover 21, and the front wall cover 93 is slightly shorter than the inner panel cover 21, so that it reaches only to the top edge 97 of the front wall 57. This difference in height is because the front wall liner 93 does not partially fold over the top of the front wall 57, as the inner panel cover 21 does when draped over the side wall top rail 29.

A tail gate cover 99 protects the tail gate 101 in the same way that the side wall covers 15 and 17 cover the outer side wall 27, the top rail 29, and the inner side wall 31. The tail gate cover 99 includes an outer cover 103 and an inner cover 105, made using the same materials and manner of construction as for the right and left side wall covers 15 and 17, except that a spine 53 and tie down straps 55 are not used. The outer cover 103 has edge fasteners 107 attached along its lower edge 109 that fit around the lower edge 111 of the tail gate 101. The inner cover 105 attaches to the tail gate 101 using wall fasteners 113 identical to the fasteners 77 used to attach the inner panel cover 21 to the inner side wall 31 as depicted in FIG. 6.

The pickup truck protector of the invention has several advantages over the prior art. It can be easily installed and removed. It has parts that present a minimum risk for scratching the paint on the truck. The pickup truck protector provides reversible surfaces to allow for a choice of linings for the bed. It provides tie-down points for securing a load in the bed. is extremely rugged and durable.

The invention has been shown in only one embodiment. It should be apparent to those skilled in the art that the invention is not so limited, but is susceptible to various changes and modifications without departing from the spirit of the invention.

What is claimed is:

1. A protector for a pickup truck having a pair of side walls, each side wall having an outer face, an inner face, a bottom edge and an essentially horizontal top rail, the protector comprising:

an outer panel cover, adapted to cover at least part of the outer face and the top rail of the side wall, and having a lower edge and an upper edge;

a plurality of edge fasteners arranged along the lower edge of the outer panel cover, for grasping the side wall bottom edge;

an inner panel cover having a bottom edge, and a top edge adapted to removably attach to the upper edge of the outer panel cover; and a wall fastener, attached to the side wall inner face, for removably attaching the bottom edge of the inner panel cover to the side wall inner face.

2. A pickup truck protector as recited in claim 1, further comprising a spine attached to the portion of the outer panel cover that rests on the side wall top rail.

3. A pickup truck protector as recited in claim 2, wherein the pickup truck has a cargo bed partially defined by the side walls, and further comprising a number of tie-downs, attached to the spine and providing means for attaching ropes, straps or similar devices for securing a load within the cargo bed.

4. A pickup truck protector as recited in claim 1, further comprising a decorative panel removably attached to the outer panel and covering at least a portion of the outer panel cover.

5. A pickup truck protector as recited in claim 4, wherein the decorative panel also displays a printed message.

6. A pickup truck protector as recited in claim 1, wherein the wall fasteners are made of the hooked portion of hook and loop fastening material; and further comprising fastening material made of the hooked portion of hook and loop material, attached to at least a portion of the upper edge of the outer cover panel, and fastening material, made of the looped portion of hook and loop material, attached to the top and bottom edges of the inner panel cover, and located in corresponding relation to the wall fasteners and to the fastening material attached to the upper edge of the outer cover panel.

7. A pickup truck protector as recited in claim 1, wherein the inner panel cover is made of two pieces of flexible planar material attached together into a single piece having sides with dissimilar surface qualities.

8. A pickup truck protector as recited in claim 1, wherein the pickup truck has a bed having a front wall, and the outer panel cover has a front edge; further comprising a flap, attached to the outer panel cover front edge, and adapted to fit over a portion of the front wall.

9. A pickup truck protector as recited in claim 3, wherein the truck also has a tail gate and a front wall facing the cargo bed, further comprising a tail gate cover adapted to cover the tail gate, and a front wall liner adapted to cover the front wall.

* * * * *